M. CLINE AND F. HERGE.
EXTENSION STEERING DEVICE.
APPLICATION FILED NOV. 20, 1920.
1,402,838.
Patented Jan. 10, 1922.
2 SHEETS—SHEET 2.
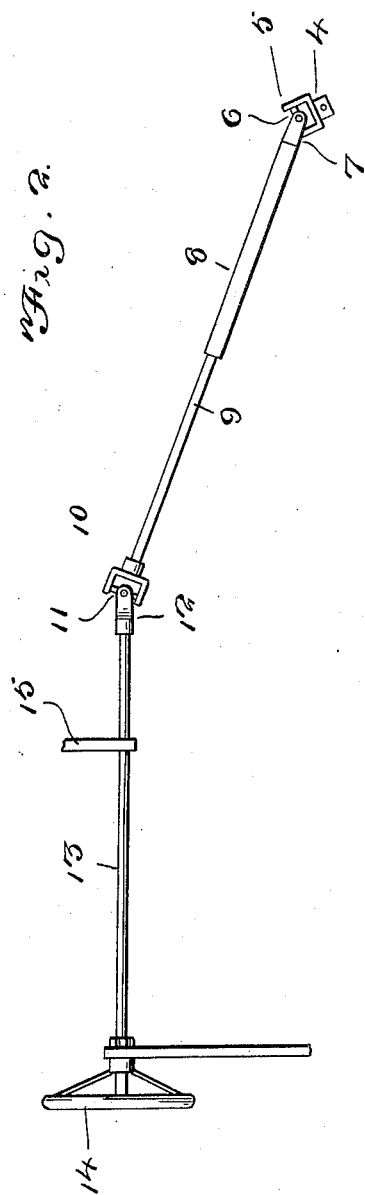
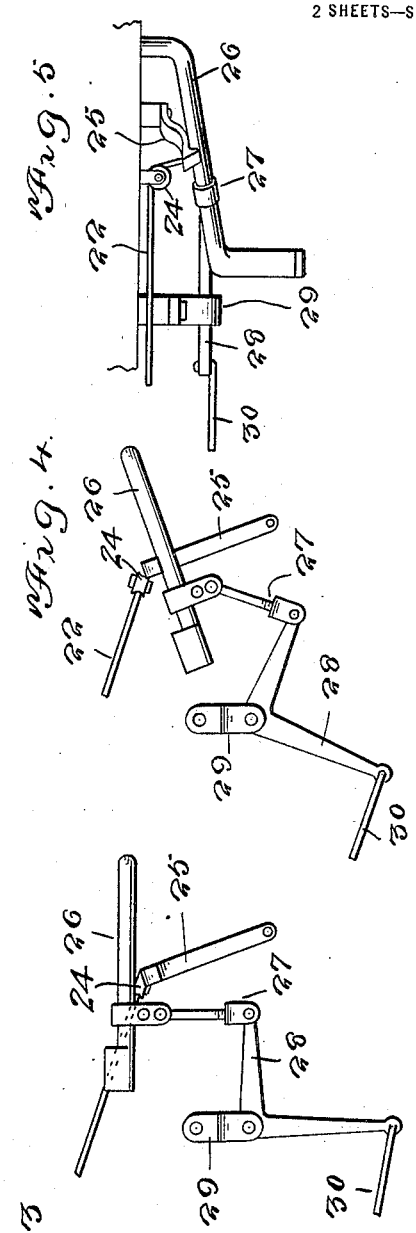
Martin Cline
Frank Herge
INVENTOR

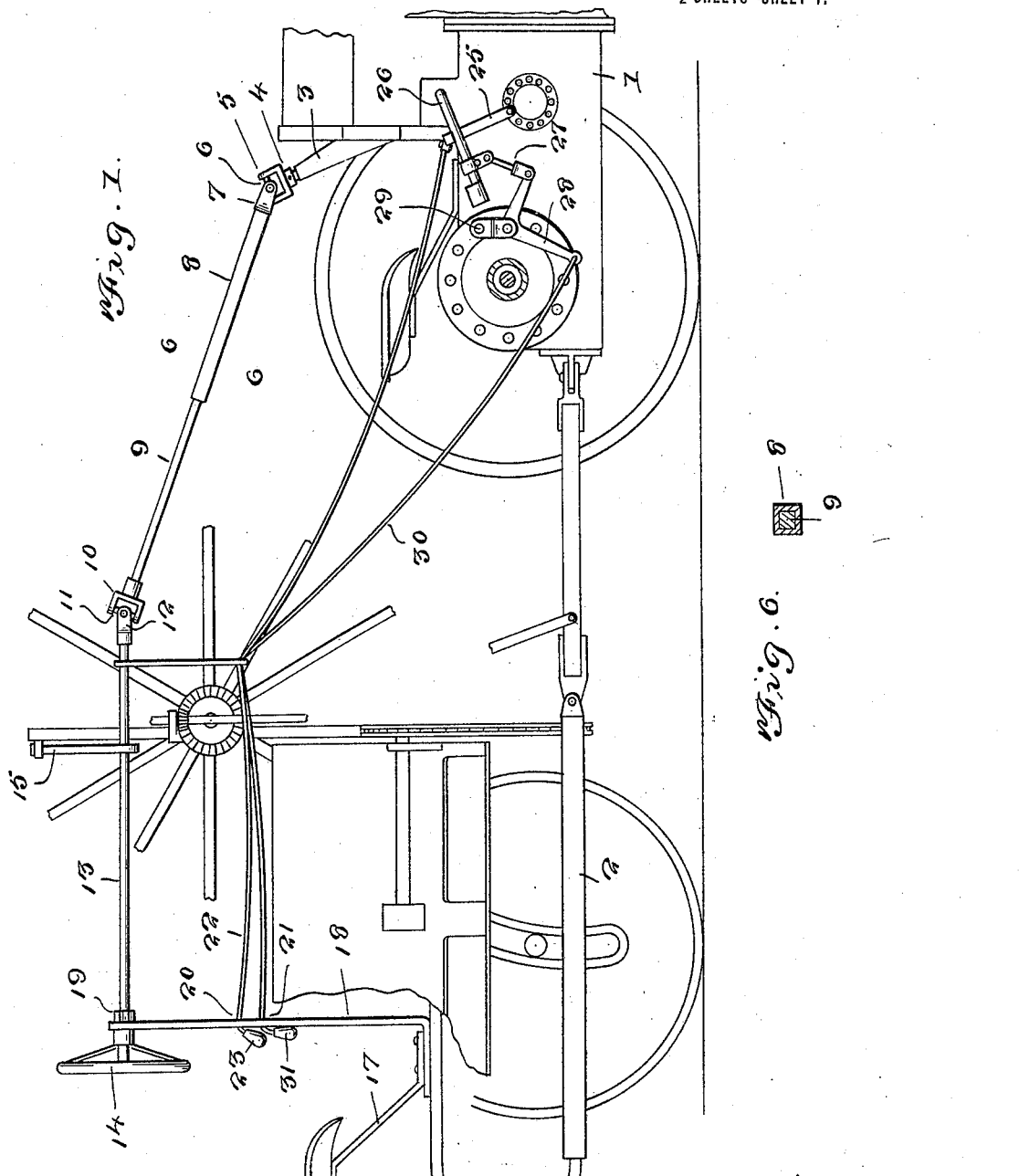

UNITED STATES PATENT OFFICE.

MARTIN CLINE AND FRANK HERGE, OF MALINTA, OHIO, ASSIGNORS TO THE STANDARD TRACTOR CONTROL COMPANY, OF YOUNGSTOWN, OHIO, A CORPORATION OF OHIO.

EXTENSION STEERING DEVICE.

1,402,838.

Specification of Letters Patent. Patented Jan. 10, 1922.

Application filed November 20, 1920. Serial No. 425,419.

*To all whom it may concern:*

Be it known that we, MARTIN CLINE and FRANK HERGE, citizens of the United States, residing at Malinta, in the county of Henry and State of Ohio, have invented new and useful Improvements in Extension Steering Devices, of which the following is a specification.

Our present invention has reference to a means for guiding and controlling a tractor from the implement to which it is hitched.

Our object is the production of means for accomplishing this purpose which shall be of a simple nature, readily attached to the implement and to the steering post, clutch, etc., of the tractor, whereby the said tractor can be effectively controlled and steered.

A further object is the production of means whereby a tractor can be controlled from a wheeled implement to which the same is hitched, the said means being of such a nature and construction as to impart a yielding movement when the tractor is directed at a curvature or angle with respect to the implement and when the tractor travels over uneven surfaces in advance of the implement.

The foregoing and other objects which will appear as the nature of the invention is better understood, may be accomplished by a construction, combination and operative arrangement of parts, such as is disclosed by the drawings which accompany and form part of this application.

In the drawings:

Figure 1 is a side elevation showing a tractor hitched to a wheeled implement having control means for the tractor arranged upon the implement in accordance with this invention.

Figure 2 is a detail side elevation of the steering mechanism,

Figure 3 is a detail view of the clutch mechanism in unlocked position.

Figure 4 is a detail view of the clutch mechanism in locked position.

Figure 5 is a detail top plan view of the clutch mechanism.

While we have illustrated our improvement in connection with a tractor of the Ford manufacture, it is to be understood that the same may be employed with equal efficiency upon other classes of tractors.

The tractor is indicated by the numeral 1, and the implement to which it is hitched by the numeral 2.

Ordinarily, one hand is required for driving the tractor, and a second hand is required for adjusting the parts of the wheeled implement which is hitched to the tractor. With our improvement only one hand need be employed, the said hand being seated on the implement so that he can readily operate the several levers for adjusting the tools of the implement, and at the same time guide and control the tractor.

The ordinary steering wheel for the tractor is removed, and on the steering post column 3 we secure the socket end 4 of a yoke 5. Through the arms of the yoke passes a pin 6. To this pin is centrally pivoted the bifurcated end of a coupling member 7. To the end of the coupling member there is secured or there may be formed a rearwardly extending tube 8. The bore of the tube is square and receives therein a square rod 9. The rod has its outer end provided with a yoke 10, the arms of which having connected thereto a pin 11, and to this pin is centrally pivoted a yoke 12 which is arranged angularly with respect to the yoke 10. The yoke 12 is provided with a tubular extension 13, and to the outer end of the said extension there is secured the steering wheel 14 which has been removed from the steering post 3. The tube or rod 13 is supported in a bracket 15 secured in any desired manner to a part of the implement 2. The universal joint connections between the tube 8, the steering post column 3, and between the rod 9 and tube 13 permit of a yielding of the steering rod constituting the aforementioned tubes and rod, so that the tractor can assume an angle with respect to the implement, and also whereby the tractor can travel over uneven surfaces in front of the implement, without affecting the latter.

Also, we remove the driver's seat from the tractor, and arrange the same on the implement. The driver's seat is indicated by the numeral 16, and in the present instance is supported on a seat post bracket 17. This bracket includes a vertical arm which is indicated for distinction by the numeral 18, the said arm having its upper end provided with a bearing opening for the tube 13, and the steering wheel may have its inner end arranged in contacting engagement with the said arm, a nut 19, screwed on the tube 13, and contacting with the outer face of the arm, holding the steering wheel in such position. It is, of course, to be understood that the seat post bracket is connected to a part of the frame of the implement in any desired or preferred manner, and the vertical arm of the said bracket is provided with two spaced openings 20 and 21, respectively. Through the opening 20 there passes a flexible element 22 that has its inner end provided with a handle 23. The outer or free end of the flexible element 22 is connected through means 24 to the clutch lock springs 25 of the tractor. The clutch lever of the tractor is indicated by the numeral 26, the same, in the present instance, having pivotally connected therewith a link 27. The link may be of an adjustable nature, and has its outer end pivoted to one arm of a bell crank lever 28. The bell crank lever is pivotally supported upon a bracket 29, and the second arm of the bell crank lever has secured thereto a flexible member 30 that passes through the opening 21 in the arm 18 of the seat post bracket. On the said end of the flexible element 30 is a handle 31.

From the foregoing description, when taken in connection with the drawings, it will be apparent that by operating either the handle 31 of the flexible element 30 or the handle 23 of the flexible element 22 the clutch means of the tractor can be controlled from the seat 16, and also, as previously stated, the machine may be guided from the occupant of the seat, and it is thought that further description will not be required by those skilled in the art to which such inventions relate.

While we have stated that the seat on the tractor is removed and placed on the implement, this is not necessarily so in every instance, as the seats of both the tractor and the implement may remain permanently thereon.

Having thus described the invention, what is claimed as new, is:—

In combination with a tractor and a wheeled implement connected thereto, of a bracket secured to said tractor, a bell crank lever pivotally connected to said bracket, a seat bracket secured to said implement, a vertical arm extending from said seat bracket and having spaced openings formed therein, a flexible member secured to one end of said bell crank lever and extending through one of said openings, a handle secured to said flexible member, an adjustable link pivotally secured to the opposite end of said bell crank lever, a clutch lever pivotally connected to said link, a spring catch secured to said tractor and adapted to engage said clutch lever, a flexible member secured to said spring catch and extending through one of said openings, a handle secured to said flexible member, a steering post extending from said tractor, universally connected telescopic rods secured to said steering post and extending through the bracket on said implement and a steering wheel secured to one of said rods.

In testimony whereof we affix our signatures.

MARTIN CLINE.
FRANK HERGE.